United States Patent [19]

Cotie et al.

[11] Patent Number: 4,667,193

[45] Date of Patent: May 19, 1987

[54] ADDRESSING SYSTEM FOR SIMULTANEOUSLY POLLING PLURAL REMOTE STATIONS

[75] Inventors: Gary R. Cotie, West Chicago; Charles H. Culp, Mundelein, both of Ill.; Daniel J. Dargis, Knoxville, Tenn.; John M. Mendala, Arlington Heights; Stephen C. Spielman, Glenview, both of Ill.

[73] Assignee: Honeywell, Inc., Minneapolis, Minn.

[21] Appl. No.: 561,004

[22] Filed: Dec. 13, 1983

[51] Int. Cl.⁴ .......................... H04Q 9/00; G05B 23/02
[52] U.S. Cl. ............................. 340/825.08; 340/825.54
[58] Field of Search ...................... 340/825.54, 825.08, 340/310 R, 310 A, 870.02, 825.6, 825.16; 370/96; 455/14, 3

[56] References Cited

U.S. PATENT DOCUMENTS

| | | | |
|---|---|---|---|
| 3,522,588 | 8/1970 | Clarke, Jr. et al. | 340/825.06 |
| 3,644,894 | 2/1972 | McCrea | 340/825.16 |
| 3,702,008 | 10/1972 | Groth | 370/96 |
| 3,755,781 | 8/1973 | Haas et al. | 340/825.08 |
| 3,755,782 | 8/1973 | Haas et al. | 340/825.08 |
| 3,836,888 | 9/1974 | Boenke et al. | 455/3 |
| 3,890,460 | 6/1975 | Haas et al. | 178/2 C |
| 4,071,908 | 1/1978 | Brophy et al. | 364/900 |
| 4,302,750 | 11/1981 | Wadhwani et al. | 340/870.02 |
| 4,586,040 | 4/1986 | Akiba et al. | 340/825.08 |

Primary Examiner—Donald J. Yusko
Attorney, Agent, or Firm—Trevor B. Joike; John P. Sumner

[57] ABSTRACT

In a contention polling arrangement wherein polling messages are transmitted by a central controller for simultaneously polling a group of remote stations, the polling message contains an address which defines the entire range of remote stations to be polled and the remote stations will respond if their addresses fall between the address contained in the polling message and an address resulting from converting any trailing 0's of the address in the polling message to 1's.

21 Claims, 11 Drawing Figures

ADDRESSING SYSTEM FOR SIMULTANEOUSLY POLLING PLURAL REMOTE STATIONS

BACKGROUND OF THE INVENTION

The present invention relates to a data communication system in which a central controller can simultaneously poll a plurality of remote stations and can resolve any contentions which occur when more than one remote station transmit messages in response to the poll request. More particularly, the present invention relates to a poll request which contains an address portion specifying the group of remote stations to be polled wherein the address portion is not required to have any more bits than are in the addresses identifying the remote stations.

Computer technologies involving data processing and data transmission have been adapted for use in building control and supervision because they offer advantages and economies which building control systems had not theretofore achieved. The prior art building control and supervision systems for maintaining comfort control and for monitoring fire and security points within the building were not able to easily minimize energy consumption in maintaining desired comfort levels nor minimize installation and hardware costs in wiring the central control function to the various loads being monitored and controlled. Instead of wiring the control function to each load separately and instead of requiring excessive amounts of hardware to achieve energy management functions, the modern building control system uses computer technology for connecting the various loads of a building over a single channel to the central control function and uses software and/or digital technology for achieving energy management control.

In a system comprising a central control station connected over a single communication channel to a plurality of remote stations, each station has a unique address and communicates with other stations by transmitting digital messages each having an address portion specifying the particular station to which the message is directed. The message will also have other portions, such as control and data portions, which may be utilized to require the addressed station to perform certain functions such as providing a status report, answer a polling message with any alarm messages which it may have to transmit to the central controller, requiring a remote station to perform a control function such as turning loads on or off, as well as requiring a wide variety of other functions.

The polling of remote stations in prior art systems was a time comsuming process. The central controller polled each of the remote stations one at a time in order to receive the desired alarm or status information. Because such a system was so time consuming, groups of stations were polled at one time. In such systems, if more than one remote station had information to report back to the central controller in response to the poll message, the reported messages clashed and the central controller received an indecipherable transmission. If such garbled messages were received, the central controllers were arranged to enter a contention poll routine in which the group to remote stations initially polled was subdivided into continuously smaller and/or different subgroups until the central controller received only clear messages.

These prior art contention polling systems have a number of drawbacks. Some systems were arranged so that each remote station was arranged to respond at a predetermined amount of delay after a poll message with each remote station having a different delay. Thus, contention may not occur until after several remote stations have transmitted. The central controller then prepared a list of stations which were possibly in contention with the first delay period at which contention occured and ending with the last station which might have transmitted, in view of transmission delays, once the controller realized that contention had taken place. The central controller was then arranged to poll each of the stations individually. This system required elaborate timing circuitry at each of the remote stations to generate the required delays and rquired complicated processing equipment at the central controller for not only recognizing which remote stations might be in contention but also for individually polling each of the possible contenders once it recognized that contention had occurred.

In other systems, the central controller simultaneously polled a group of stations and if more than one response was received and the responses conflicted with one another, the central controller conducted a poll of some lesser plurality or subgroup of the remote stations that were polled previously. The system kept subdividing until contending responses were eliminated. In these systems, however, the central processor transmitted both an address characterizing the first station of the poll and a second address characterizing either the extent of the poll or the address of the last station of the poll, thus requiring the transmission of two words to define the extent of the poll.

In systems of the nature described above, there has been the practice in some cases to transmit the information between the various stations of the system over the power lines of the building in which the system is located. Certain buildings such as large factories may require, however, more than one power feed into the building. It has been the practice in the prior art to connect the central controller to a master modem for communication with one of the power feeds and to interconnect the other power feeds by the use of repeaters. The use of a master modem with a plurality of repeaters depending on the number of power feeds makes isolation of the power feeds from one another more difficult and does not allow for the kind of flexibility which is required for systems of this type.

SUMMARY OF THE INVENTION

Accordingly, the present invention involves a system for polling a plurality of remote stations at one time and for resolving contentions which may occur when two or more remote stations report by continuously subdividing the group of remote stations into smaller and/or different subgroups until contentions are eliminated. The poll message contains an address portion of only one word duration which defines by itself the group of remote stations to be polled. Thus, the present invention is directed to a data transmission system having a central controller for transmitting polling messages, a communication channel connected to the central controller, and a plurality of remote control modules connected to the communication channel for receiving the polling messages, the polling messages having an address portion therein, and each remote control module having the capability of recognizing any trailing "zeros" in the end of the address message and determining if its own address is included within the address contained in the polling message and an address which results from converting the trailing "zeros" of the address in the polling message to "ones".

Another aspect of the invention is a system involving a plurality of transponders, one transponder for each power feed into the building for interconnecting its associated power feed with the central controller. Each transponder is microprocessor based and functions to receive and transmit messages between the central controller and the remote control modules to which it is connected. Also, when the transponder receives messages from its remote control modules to pass on to the central controller during a polling operation, it will report that information back to the central controller if no transponder having higher priority has responded but will reset its registers if a transponder having higher priority has responded.

BRIEF DESCRIPTION OF THE DRAWINGS

These and other features and advantages will become more apparent from a detailed consideration of the invention when taken in conjunction with the drawings in which.

DETAILED DESCRIPTION

Figure 1:
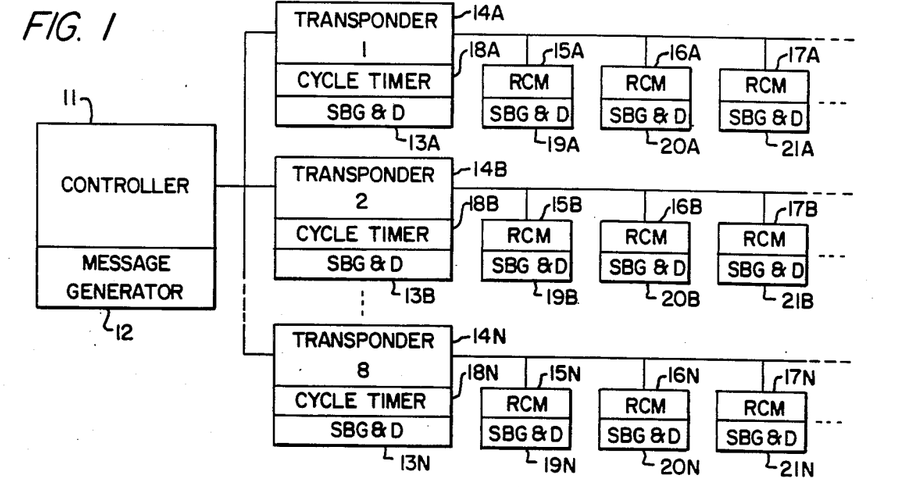
FIG. 1 shows a circuit schematic of the data processing system according to the present invention.

The system shown in FIG. 1 is particularly useful when the communication channel is selected to be power line carriers within a building although it is to be understood that the present invention may be used on systems other than power line carrier systems. The system comprises central controller 11 which directs the control and supervisory functions of a plurality of remote stations. Such functions can include energy management functions for controlling a building's air conditioning plant to establish and maintain the environmental conditions within a building at comfortable levels as well as alarm functions such as may involve the monitoring of fire and security points around the building. Controller 11, as is typical in systems of this nature, contains a message generation portion 12 for generating messages transmitted between controller 11 and its remote stations.

By way of example only, controller 11 can be connected to a plurality of transponders 14A, 14B and so on through 14N, with N in this particular example being selected as the number 8. Thus, eight transponders can be connected to controller 11. In this particular example, the system is designed to accommodate up to eight transponders so that each transponder can channel messages between controller 11 and the associated remote stations over a corresponding power feed through a building. The system shown in FIG. 1 can handle up to eight power feeds to a building. If the building has only one power feed, then only one transponder is needed.

The connection between controller 11 and transponders 14 can, by way of example, be conducted over a 20 milliamp current loop.

Transponder A is then connected over the power lines in a power feed system to remote control stations or modules 15A, 16A, 17A and so on. Each of the other transponders is also connected by its respective power line system to a number of remote control modules as shown in FIG. 1.

Each transponder has a cycle timer portion 18 the function of which will be described hereinafter in connection with FIG. 9. Each transponder also has a start bit generation and detection portion 13 so that the associated transponder 14 in transmitting messages to the remote control module means can provide a start bit to be recognized by the remote control modules and can detect start bits of messages initiated by the remote control modules. Similar to transponders 14A-14N, each remote control module has a message generating portion 19, 20, 21 and so on for generating messages and for providing start bit generation and detection.

Controller 11, transponders 14 and remote control modules 15-17 can each contain a microcomputer for more easily performing the control functions necessary to such a system. The transponder microcomputer can be arranged to control both the current loop receive and transmit function between controller 11 and the transponder, and the power line carrier receive and transmit function between the transponder and the remote control modules connected to it over its associated power line, as well as error detection and any desired housekeeping information functions. The remote control module microcomputer controls power line carrier receive and transmit functions, performs error detection, and controls analog and digital input sensing and output control as well as any desired housekeeping functions.

Such systems are familiar in the arts and need not be elaborated on here except to show the particular message construction which is provided by the apparatus shown in FIG. 1 and to explain how the start bit in the message can be distinguished from data bits.

Figure 2:
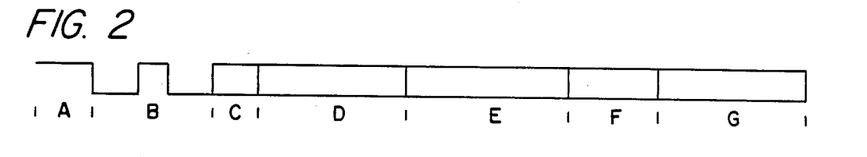
FIG. 2 shows a message which can be transmitted between the controller and the remote control modules of FIG. 1, the message having a start bit portion B.

The message which can be transmitted between the transponders and remote control modules may take the form shown in FIG. 2. This message may have a portion "A" which is simply a portion for conditioning the transmission line and which may have a duration of 1 bit time.

Portion "B" is a start bit to inform receiving stations that a data transmission is beginning. For purposes of the present invention, a start bit is defined as either a single bit or a multiple bit sequence used to define the start of a data transmission.

Portion "C" is a direction bit, which may be only 1 bit in length, for indicating the direction of the message. One remote station, depending upon system configuration, need not read messages which are being transmitted from another remote station to the central controller 11. Bit C can perform this function.

Portion "D" contains a function code and can include 7 bit times for indicating the particular function of the message. The message could be a poll message, a control message, a status report message, an information message or the like.

Portion "E" is an address portion which may be 8 bits in duration defining the address to which a particular message is directed.

Portion "F" is a point number field. This portion is used for transmissions from controller 11 to remote control modules and contains a number of bits to define the specific point controlled or supervised by a remote control module which is to perform some function as directed by the controller 11.

Finally, portion "G" is a multibit cyclic redundancy character error checking portion.

Figure 3:
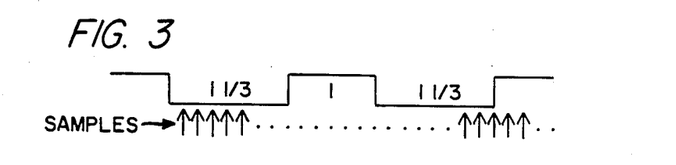
FIG. 3 shows the start bit portion B of the message in FIG. 2 in more detail.

The start bit is shown in more detail in FIG. 3. At least a portion of the start bit has a duration which is of a different length in terms of time from a data bit. The start bit can be a single bit, i.e. a continuous signal level bounded by two opposite signal transitions, having a duration which is fractionally rather than integrally related to a data bit. For example, the start bit may be a zero having a length which is ⅓, ⅔, 4/3 or the like of a data bit. Accordingly, the start bit may have a duration which is n/m again as long as a data bit where m>n or m<n but not m=n. Thus, the receiving station can measure the length of time of the bits received and determine when a start bit is received and can then distinguish that start bit from data bits.

However, an extra level of protection can be obtained from the particular example shown in FIG. 3, wherein the start bit is in actuality a sequence of three individual bits because this bit pattern can be more easily discernible by the receiving station. The first and third individual bits have a length which is 1⅓ as long as a data bit and a second intermediate bit which is of the same length as a data bit. The overall bit is therefore 3⅔ the length of a normal data bit.

In prior art systems, receivers typically recognize bits by sampling in the middle of a bit time to determine whether it has received a 0 or a 1. In the case of the start bit shown in FIG. 3, such a prior art system will not be able to distinguish between a bit which has a fractional relationship to a data bit. Accordingly, multiple samples of incoming bits must be taken in order to determine whether this fractional relationship has occurred. As shown in FIG. 3, the multiple samples will indicate that the start bit does bear a fractional relationship to a data bit.

Figure 4:
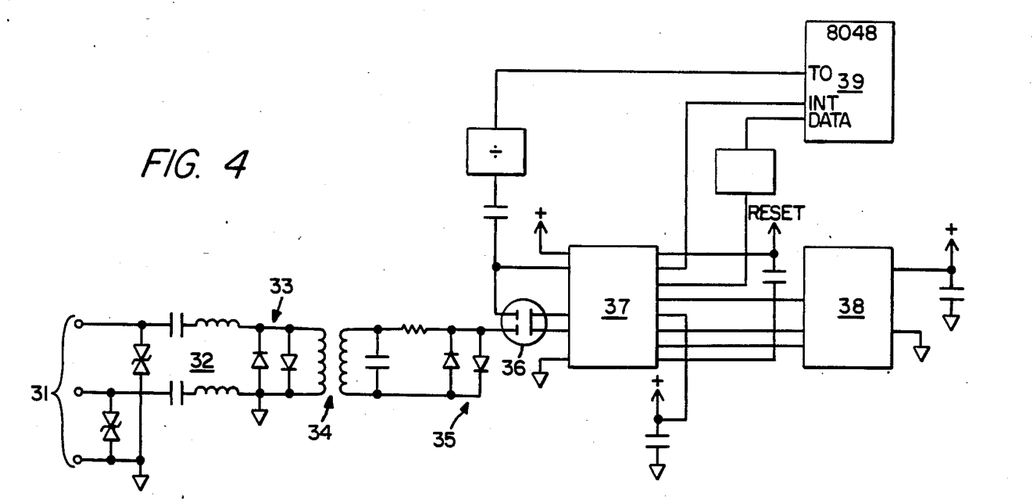
FIG. 4 shows an arrangement wherein the microprocessor of either the transponder or the remote control module can sample the bits received to distinguish a start bit from a data bit.

FIG. 4 shows a circuit apparatus which can be used at both the transponder and at the remote control modules for start bit detection. The terminals 31 are connected to the power line to which the particular station is associated and a filtering section 32 is provided for filtering out the 60 cycle power line current. Only system messages should be present past the filter section 32. Clipping diodes 33 are provided for clamping the received signal and step-up transformer 34 is provided for bandpass filtering. Additional diodes 35 are provided for additional limiting with the received signal being supplied to mixer 36. The mixed signal is amplified and further limited by circuit 37 and connected to circuit 38 which provides active filtering at the mixed down frequency-shift-keying frequencies chosen for transmission. The signal is then connected back from device 38 to device 37 for detection and is then supplied to microprocessor 39. One output of circuit 37 is connected to the interrupt terminal of processor 39 and the other output from device 37 is connected to the data input terminal of device 39.

As shown in FIG. 3, microprocessor 39 repetitively samples the information at its interrupt terminal. Microprocessor 39, because of this multiple sampling, can then distinguish a start bit such as that shown in FIG. 3 from normal data bits. Since the start bit bears a fractional relationship to data bits, it will not be confused between the start bit and a data bit.

When controller 11 requests a group poll of remote stations, it issues a message similar to that shown in FIG. 2. In this case, the function code portion "D" will indicate a group poll and address portion "E" will contain an address defining the addresses of the remote stations in the group. In the specific example shown, an address unique to the remote station is stored in each remote station. This address is comprised of N bits which may in this example be 8 bits. Address field E also contains 8 bits. If there are trailing 0's, that is the contiguous 0's which occupy the lesser significant bits of the address portion in field "E" starting with the least significant bit, then the group being polled is defined as a range of addresses starting with the address in field "E" and ending with an address determined by changing all trailing 0's to 1's. In this way, a single word can define the entire range of addresses within the poll.

As examples, if the address in the polling message contains all 0's, then the low end of the range is as defined by the address, i.e. 00000000, and the high end is defined by changing all trailing 0's in the received address to 1, i.e. 11111111. If the received address is 01000000, then the range is defined on the low end by 01000000 and at the high end by 01111111. As a third example, if the received address is 10110111, then the range is defined on the low end by 10110111 (the received address) and at the high end by 10110111 (since there are no trailing "0's").

Figure 5:
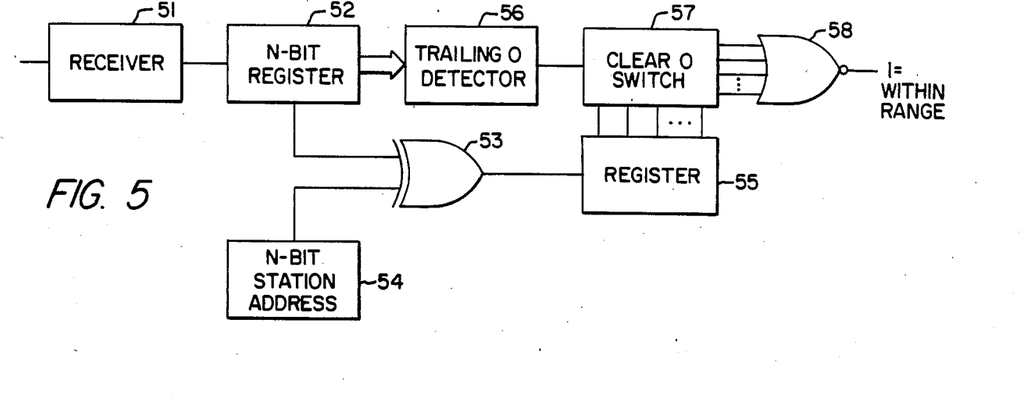
FIG. 5 shows a functional diagram wherein a station can determine if its address falls within the range defined by the address contained in a polling message.

Although this function may desirably be performed by the microcomputers in the remote control modules, FIG. 5 shows a functional block diagram of how a remote station can recognize whether its address is within the range of addresses relating to the group of stations or modules being polled.

The incoming message is received by receiver 51 of FIG. 5. The address is then shifted into an N bit register where N stands for the number of bits in the address. Each station has a unique address, also comprised of N bits. EXCLUSIVE OR 53 then compares the received address stored in N bit register 52 with the N bit station address stored in register 54, the result of the comparison being stored in EXCLUSIVE OR output register 55. Also, the parallel information stored in N bit register 52 is connected to trailing "zero" detector 56 which detects any trailing zeros and clears the corresponding bit positions in register 55 by use of a clear zero switch 57. The output from switch 57 is then connected as inputs to NOR gate 58 which will provide a "1" output only if all inputs are "0".

Thus, the EXCLUSIVE OR operation will compare the received address with the stored address bit by bit. Because of the EXCLUSIVE OR operation, for each bit position in which register 52 and register 54 contain the same bit value, EXCLUSIVE OR gate 53 will provide a "0". EXCLUSIVE OR gate 53 will only provide a "1" for those bit positions which have different bit values stored in register 52 and register 54. If trailing "0" detector clears those "1's" stored in register 55 corresponding to the trailing "0" bit positions of the address stored in register 52 and if only "0's" remain, the circuit of FIG. 5 has determined that the address stored in register 54 is within the range identified by the address stored in register 52. In this way, the functional apparatus shown in FIG. 5 determines whether the station address stored in register 54 is included within a range of addresses beginning with the address received in register 52 and ending with an address resulting from changing the trailing "0's" of the address stored in register 52 to "1's".

Figure 6:
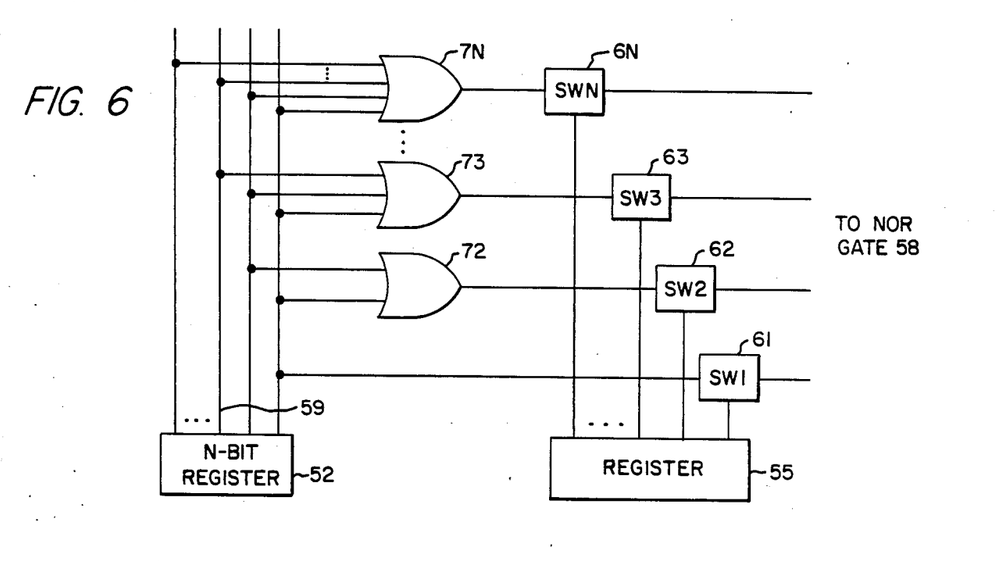
FIG. 6 shows the trailing "zero" detector of FIG. 5 in more detail.

FIG. 6 shows functionally how the trailing "0" detector 56 can operate. The outputs of registers 55 are connected to individual switches 61, 62, 63 to 6N. The least significant bit in the address stored in register 52 is connected directly to control switch 61. If this bit value is a "0", switch 61 will supply a "0" output to NOR gate 58 regardless of the value of the corresponding bit position from register 55. The least significant bit output from register 52 is "OR"ed by OR gate 72 with the next least significant bit and the output of OR gate 72 controls switch 62. If the two least significant bits from register 52 are both "0's", then the output from OR gate 72 is also a "0" and switch 62 insures a "0" output to NOR gate 58 regardless of the value of the corresponding bit position in register 55. As can be seen from FIG. 6, if any bit position in register 52 has a "1" output, its associated OR gate and all higher OR gates will have a "1" output operating the corresponding switches to connect the corresponding outputs of register 55 to NOR gate 58. In this way, the bit positions in register 55 corresponding to the trailing "0" positions stored in register 52 will be cleared with the remainder of the outputs from register 55 being connected to the input of NOR gate 58 as is. If any of these outputs have a "1", then there is no match between the address received and the station address and, thus, the station will not respond to the poll.

Switches 61-6N can be two position switches. In the first position, the corresponding input to NOR gate 58 is connected to ground; this position results from a zero int to the switch. In the other position, the corrsponding input to NOR gate 58 is connected to its associated output from register 55; this position results from a one input to the switch.

As an example of this operation, if a poll address of 11011000 is received by a remote station having an address of 11011100, an EXCLUSIVE OR is performed to obtain 00000100. The "1" in this result is supplied as an input to switch 63. However, since there are three contiguous trailing "0's", the OR gates 72 and 73 provide "0" outputs so that the control inputs to switches 61-63 are all "0". Thus, the "1" input to switch 63 is cleared and NOR gate 58 has all "0" inputs determining that the address of the remote device falls within the specified range. As another example, if the address in the polling message is 11011010 and the remote device has an address of 11011100, the EXCLUSIVE OR operation results in 00000110. Since there is only one trailing 0 in the address received, the last bit position of the EXCLUSIVE OR register is cleared and the remaining bit positions are used to determine whether there is a match. Since not all bit positions contain 0's, there is no match.

Figure 7:
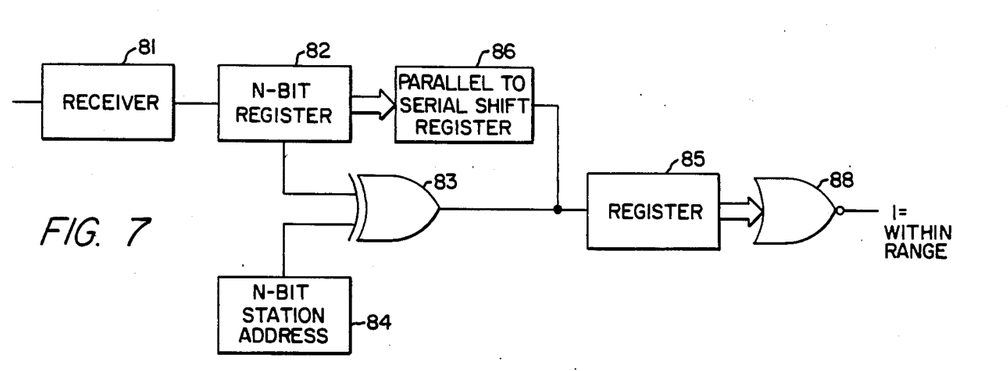
FIG. 7 shows an alternative arrangement for determining whether a station address falls within the range established by the address contained in the polling message.

FIG. 7 shows an alternative method for determining whether a station address is between the address received and an address resulting from converting any and all trailing "0's" of the received address to "1's". The functional alternative represented by the circuit of FIG. 7 takes any trailing "0's" in the received addresses and shifts them into that end of the EXCLUSIVE OR register having the most significant bit. In this manner, the number of least significant bits shifted out of the EXCLUSIVE OR register will be the same as the number of trailing "0's".

Thus, as shown in FIG. 7, the received address is recieved in receier 81 and stored in N bit register 82. EXCLUSIVE OR gate 83 compares this received address with the stored address in register 84 with the output of the comparison being stored in EXCLUSIVE OR register 85. Then, a parallel to serial shift register 86 will shift the trailing "0's" stored in register 82 into register 85. The outputs of register 85 are then connected as inputs to NOR gate 86 with a result similar to the apparatus shown in FIGS. 5 and 6.

As an example of this operation, if the poll address is 11011000 and the station address is 11011100, the EXCLUSIVE OR is performed to obtain 00000100. The first trailing zero is shifted into this result to obtain 00000010, the next to obtain 00000001, and the third to obtain 0000000. Since all positions are "0", there is a match.

As another example, if the poll address is 11011010 and the station address is 11011100, the EXCLUSIVE OR is performed to obtain 00000110. Since there is only one trailing "0" in the poll address, only one "0" is shifted into the EXCLUSIVE OR result yielding 00000011. Because not all bit positions contain a "0", NOR gate 58 will indicate that the station address is outside of the poll addresses.

Since the system shown in FIG. 1 can handle up to 8 transponders, more than one transponder can receive a message from their associated remote control modules because either alarms can occur on more than one power feed at the same time or, since transformers vary in the isolation at the particular frequencies used for transmission, an alarm message sent on one power feed potentially can be detected by both the transponder on the power feed on which the alarm originated and a transponder on another power feed because of the poor isolation. The present system provides a slotted contention arrangement for allowing plural transponders which have messages to report to communicate with the controller.

In this system, the transponder having the highest priority is given the lowest number and the transponder having the lowest priority is given the highest number with the remaining transponders prioritized therebetween.

When the transponders receive a message from the controller, they transmit that message on their respective power feeds simultaneously. At the time each transponder finishes this retransmission, it sets a timer 18. This timer controls the time when the transponder may respond to the controller. The transponder having the highest priority is set to respond first, the transponder with the next highest priority is set to respond a short time delay after the transponder having the highest priority and so on with the transponder having the lowest priority set to respond last after the most time delay. If any transponder responds during its time slot, the remaining transponders detect that transmission to the controller. When one message is sent to the controller, the other transponders clear any pending messages and wait for the next message outbound from the controller.

Figure 8:
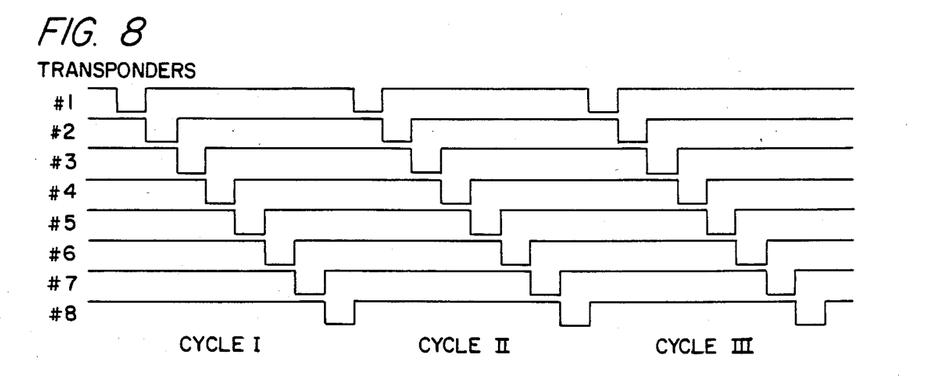
FIG. 8 shows an operation in which the transponder shown in FIG. 2 can convey messages from the remote control modules to the controller to resolve contentions between various transponders; and, FIGS. 9A-9C show one of the transponders in FIG. 1 in more detail.

FIG. 8 illustrates the sequence of time slots. When non-contention poll messages (i.e. poll messages for which contentions will not arise) are sent from the controller, only two cycles of slotted contention on the current loop between controller 11 and the transponders may be required. However, for "all poll" messages or for poll messages which may result in contention, three cycles may be required.

Each transponder then has a timing function which separates the three cycles and determines when messages are transmitted. The first cycle will report back good messages, i.e. non-garbled messages wherein only one of the remote control modules to which it is connected has responded. If transponder 1 has no good messages, for example, transponder 2 is then given the chance to respond with good messages and so on. However, once a transponder has transmitted a good message to the controller, other transponders having lower priority will not report their messages back on the current loop. At this point, the cycling terminates and the transponders wait for another message from the controller which may be another polling message to pick up the other transponder responses.

If none of the transponders have received a good message from their remote control modules, the slotted contention function then proceeds to the second cycle. For "all poll" messages, any transponder which received a garbled message will respond in the appropriately prioritized time slot. The controller upon receiving this message will then determine that there is contention and will operate through the transponders to resolve the contention by polling to resolve that contention by polling subgroups of remote control modules. If any transponder responds during this cycle, the remaining lower priority transponders clear their pending messages and wait to receive another message.

Cycle 3 is used in the case where no transponders have responded during cycles 1 or 2. At this point, the highest priority transponder will transmit back a no response message to the controllers. In this way, the failure time out delay, which is long to accommodate the worst case situation, need not be waited upon.

Figure 9A:
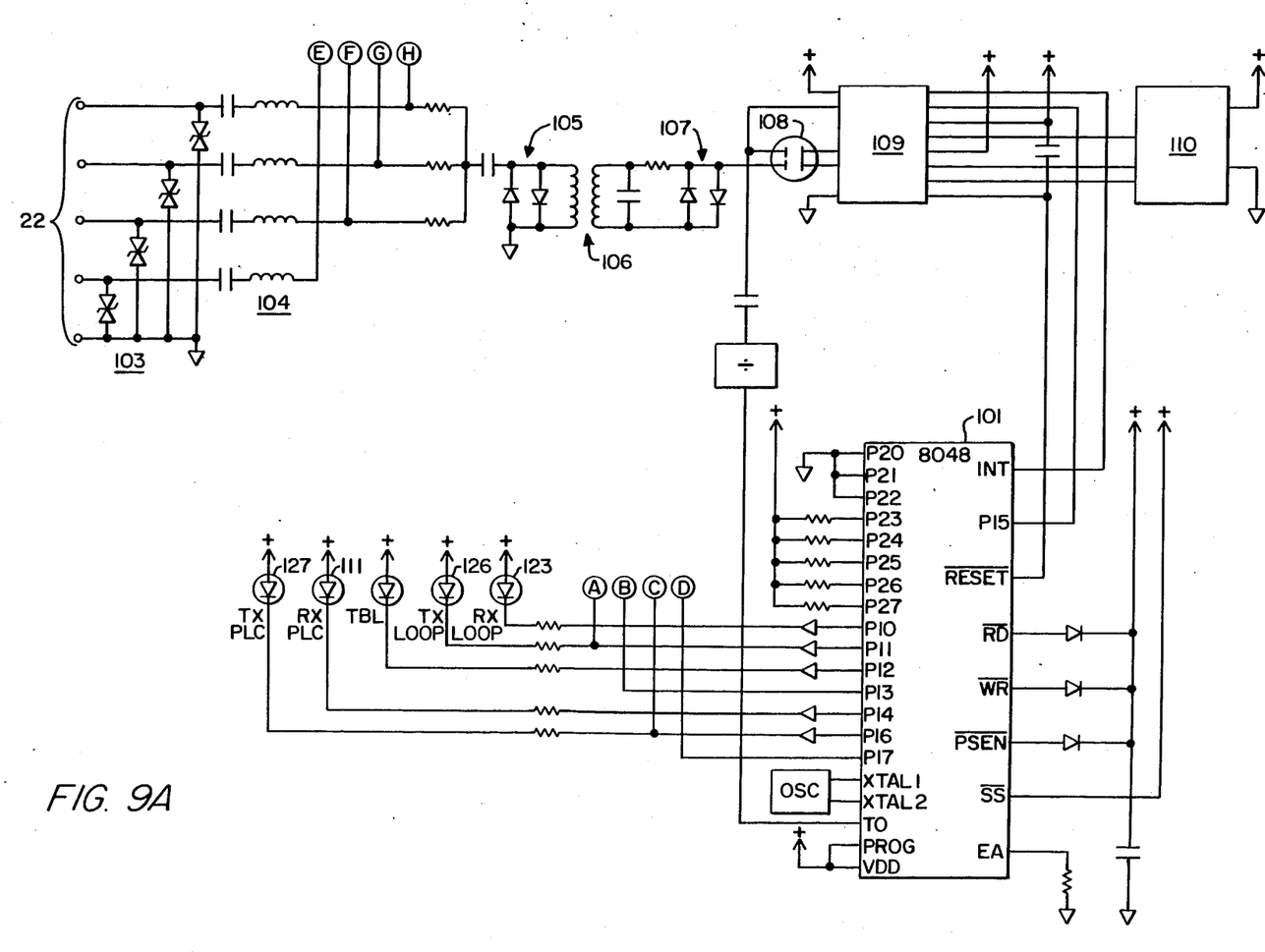
Figure 9B:
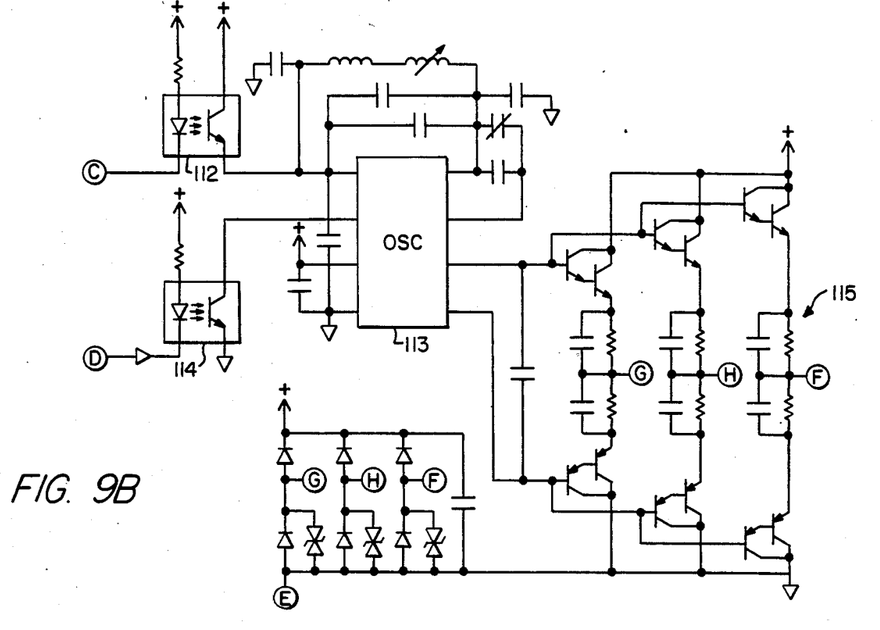
Figure 9C:
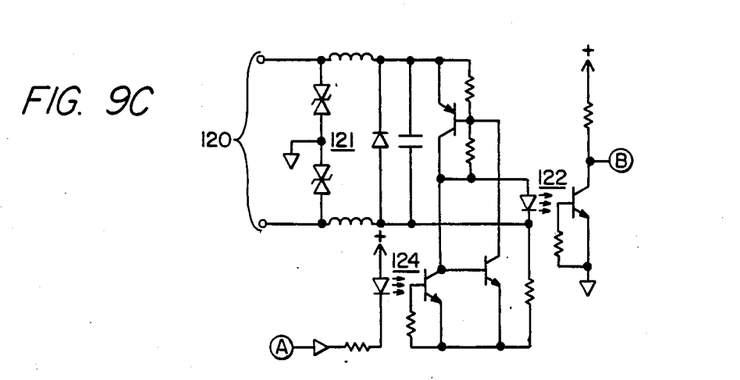

FIGS. 9A-9C show any one of the transponders in FIG. 1 in more detail. The heart of the transponders is the microprocessor 101 which is coupled both to receive and transmit over the current loop in connection with the central controller as well as over the power feed in connection with the remote control modules to which it is associated. Thus, terminals 22 are connected to the power feed for communication between the transponder and the remote control modules. The signals received on terminals 22 are supplied through protection break down devices 103. Filter section 104 provides blocking of the 60 hertz power signal. The communication messages are limited by diodes 105, filtered by transformer 106 and further limited by diodes 107. The signal is mixed by mixer 108, and amplified, limited and detected by circuit 109. Active filtering at the mixed down frequency is provided by circuit 110 and the output from the circuits are connected to the input interrupt terminal and the input P15 terminal of microprocessor 101.

When the transponder is receiving over the power lines, LED 111 will be flashed at pin P14 of microprocessor 101 to provide a visual indication of this mode of operation.

Data can be transmitted over the power line by microprocessor 101 by the circuit apparatus shown in FIG. 9B. In this case, the outputs from microprocessor 101 are connected over terminals C and D to the apparatus shown in FIG. 9B. Thus, terminal C from pin 16 of microprocessor 101 provides a transmit enable signal through opto-isolator 112 to the enabling input of oscillator 113 of FIG. 9B. The oscillator, 113 then operates under the control of pin P17 of microprocessor 101 through terminal D and opto-isolator 114 to provide outgoing data through the Darlington transistors 115 to terminals F, G and H for transmission over the power lines through terminals 22 shown in FIG. 9A. LED 127 is provided to indicate that the transponder is transmitting over the power lines.

The transponder can also communicate with the central controller. The transponder is connected to the current loop between the transponder and the central controller by terminals 120 shown in FIG. 9C. Protection against voltage surges is provided by break down devices 121 and the signal is filtered and opto-isolated at 122 before it is supplied over terminal B to pin 13 of microprocessor 101. During reception of information over the current loop, LED 123 is flashed by control from P10 of microprocessor 101.

Microprocessor 101 through terminal A can also transmit information over the current loop to the central controller. In this case the information is connected through opto-isolator 124 to terminals 120 as shown for transmission over the current loop to the central controller. LED 126 is provided to give an indication that the transponder is transmitting over the current loop.

The embodiments of the invention in which an exclusive property or rights is claimed are defined as follows:

1. A system having a central controller for polling a plurality of remote control modules, said controller polling groups of said remote control modules simultaneously and for resolving contentions when two or more remote control modules respond to a polling request by polling continuously smaller and/or different groups of remote control modules until contentions are resolved, said system comprising:
   central controller means for transmitting a polling message, said polling message including an address of N bits for defining a group of addresses relating to a group of remote control modules selected by said central controller to be polled;
   communications means connected to said central controller;
   a plurality of remote control modules connected to said communication means for receiving said polling message, each of said remote control modules having a unique N bit address stored therein and address comparison means for comparing said N bit address in said poll message to said N bit address of said remote control module to determine if said remote control module is within said group of remote control modules to be polled.

2. The system of claim 1 wherein said address comparison means comprises means for responding to any remote control module address between said address in said poll message and an address resulting from converting any contiguous trailing "0's" at the end of said address in said poll message to "1's".

3. The system of claim 2 wherein said comparison means comprises means for ignoring bits of said remote control module address corresponding to contiguous trailing "0's" of said address contained in said poll message.

4. The system of claim 3 wherein said comparison means comprises EXCLUSIVE OR means for exclusively oring the station address with the address in the polling message and for providing a result of this comparison.

5. The system of claim 4 wherein said comparison means comprises means for clearing bit positions in said result corresponding to the trailing "0's" of said address contained in said polling message.

6. The system of claim 4 wherein said comparison means comprises means for shifting into said result the trailing "0's" of said address contained in said polling message and thereby shifting out of said result the bit positions corresponding to the trailing "0's" of said address in said polling message.

7. The system of claim 3 wherein said communication means comprises transponders each of which will respond with messages from the remote control modules, said transponder with a highest priority responding first and each of the others of said transponders responding after an additional delay wherein the delay for each transponder is difficult and depends upon the priority assigned to each transponder, said transponders arranged to respond in a first cycle of delays if the transponders have non-contending messages to report, in a second cycle of delays if said transponders have contending messages to report, and in a third cycle of delays if said transponders have neither good messages nor contending messages to report.

8. The system of claim 1 wherein said communication means comprises transponders each of which will respond with messages from the remote control modules, said transponder with a highest priority responding first and each of the others of said transponders responding after an additional delay wherein the delay for each transponder is different and depends upon the priority assigned to each transponder, said transponders arranged to respond in a first cycle of delays if the transponders have non-contending messages to report, in a second cycle of delays if said transponders have contending messages to report, and in a third cycle of delays if said transponders have neither good messages nor contending messages to report.

9. A system having a central controller for polling a plurality of remote control modules, said controller polling groups of said remote control modules simultaneously and for resolving contentions when two or more remote control modules respond to a polling request by polling continuously smaller and/or different groups of remote control modules until contentions are resolved, said system comprising:

central controller means for transmitting a polling message, said polling message including an address defining a group of addresses relating to a group of remote control modules selected by said central controller to be polled, said address potentially containing trailing "0's", said trailing "0's" being a 0 in the least significant bit position of said address and any 0's which are contiguous thereto;

communication means connected to said central controller;

a plurality of remote control modules connected to said communication means for receiving said polling message, each of said remote control modules having a unique address stored therein and including means for determining whether its address falls within a range established by the address contained in the polling message and an address resulting from converting any trailing "0's" in the address of the polling message to "1's".

10. The system of claim 9 wherein said comparison means comprises means for ignoring bits of said remote control module address corresponding to contiguous trailing "0's" of said address contained in said poll message.

11. The system of claim 10 wherein said comparison means comprises EXCLUSIVE OR means for exclusively oring the station address with the address in the polling message and for providing a result of this comparison.

12. The system of claim 9 wherein said comparison means comprises means for clearing bit positions in said result corresponding to the trailing "0's" of said address contained in said polling message.

13. The system of claim 11 wherein said comparison means comprises means for shifting into said result the trailing "0's" of said address contained in said polling message and thereby shifting out of said result the bit positions corresponding to the trailing "0's" of said address in said polling message.

14. The system of claim 10 wherein said communication means comprises transponders each of which will respond with messages from the remote control modules, said transponder with a highest priority responding first and each of the others of said transponders responding after an additional delay wherein the delay for each transponder is different and depends upon the priority assigned to each transponder, said transponders arranged to respond in a first cycle of delays if the transponders have non-contending messages to report, in a second cycle of delays is said transponders have contending messages to report, and in a third cycle of delays if said transponders have neither good messages nor contending messages to report.

15. The system of claim 9 wherein said communication means comprises transponders each of which will respond with messages from the remote control modules, said transponder with a highest priority responding first and each of the others of said transponders responding after an additional delay wherein the delay for each transponder is different and depends upon the priority assigned to each transponder, said transponders arranged to respond in a first cycleof delays if the transponders have non-contending messages to report, in a second cycle of delays if said transponders have contending messages to report, and in a third cycle of delays if said transponders have neither good messages nor contending messages to report.

16. A station arranged for receiving a polling message from a remote station, said polling message containing an address of N bits for defining a group of addresses relating to a group of stations selected to be polled, said station comprising:

receiving means for receiving said polling message;

address storage means for storing an N bit station address unique to said station; and, address comparison means for comparing said N bit address in said polling message to said N bit station address of said address storage means to determine if said N bit station address is within said group of addresses defined by said N bit address contained in said polling message.

17. The station of claimed 16 wherein said address comparison means comprises means for responding to any address between said address in said polling message and an address resulting from converting any contiguous trailing "0's" at the end of said address in said polling message to "1's".

18. The station of claim 17 wherein said comparison means comprises means for ignoring bits of said station address corresponding to contiguous trailing "0's" of said address contained in said polling message.

19. The station of claim 18 wherein said comparison means comprises EXCLUSIVE OR means for exclusively oring the station address with the address in the polling message and for providing a result of this comparison.

20. The system of claim 19 wherein said comparison means comprises means for clearing bit positions in said result corresponding to the trailing "0's" of said address contained in said polling message.

21. The station of claim 19 wherein said comparison means comprises means for shifting into said result the trailing "0's" of said address contained in said polling message and thereby shifting out of said result the bit positions corresponding to the trailing "0's" of said address and said polling message.

* * * * *